United States Patent [19]
Licitis

[11] 3,829,207

[45] Aug. 13, 1974

[54] SOUND RECORDING AND REPRODUCING DEVICE WITH VISUAL IMAGE MEANS

[75] Inventor: Gunars Licitis, Lombard, Ill.

[73] Assignee: Marvin Glass & Associates

[22] Filed: Aug. 3, 1973

[21] Appl. No.: 385,281

[52] U.S. Cl. .................. 353/120, 274/13 A
[51] Int. Cl. .................. G03b 31/06
[58] Field of Search .................. 274/13 A; 353/15–19, 120

[56] References Cited

UNITED STATES PATENTS

| | | | |
|---|---|---|---|
| 714,707 | 12/1902 | Jones | 274/13 A |
| 3,751,151 | 8/1973 | Petterson | 274/13 A |

*Primary Examiner*—Harry N. Haroian
*Assistant Examiner*—A. Jason Mirabito
*Attorney, Agent, or Firm*—Coffee & Sweeney

[57] ABSTRACT

A sound recording and reproducing device to be used alone or in conjunction with photographs or similar still visual images. Both a sound recording or reproducing track and the still images are replaceable in order that a message or statement pertinent to the subject matter of a still image can be associated by the sound reproducing or recording track while at the same time permitting the device to be used with a plurality of visual images and sound reproducing or recording tracks. The device comprises a frame for supporting the still images on one side thereof, a rotatable surface which supports the sound track, and a non-concentric rotatable spiral track to establish a locus for a recording or reproducing head.

4 Claims, 3 Drawing Figures

SOUND RECORDING AND REPRODUCING DEVICE WITH VISUAL IMAGE MEANS

BACKGROUND OF THE INVENTION

Sound reproducing devices have previously been produced so as to be operated in conjunction with visual still images whereby a message or statement was attributed to or associated with the particular visual image. However, such prior art devices relied either on a completely separate implement or structure for providing a locus whereby the pickup head was properly oriented with respect to the sound track or they contained a locus generating device as an integral part with the sound track such as the device disclosed in U.S. Pat. No. 3,682,482. Other prior art devices are shown in the following known patents: W. G. H. Finch, U.S. Pat. No. 2,136,209; R. Neal, U.S. Pat. No. 2,314,417; C. M. MacChesney, U.S. Pat. No. 2,849,542; M. Schwartz et al. U.S. Pat. No. 2,961,922; Yasushi Hoshino et al., U.S. Pat. No. 2,973,410; J. R. Dennis, U.S. Pat. No. 3,000,638; M. Schwartz et al., U.S. Pat. No. 3,145,616; J. W. Ryan et al., U.S. Pat. No. 3,477,140; R. D. Hipp, Jr., U.S. Pat. No. 3,504,967; William A. Holmes, U.S. Pat. No. 3,682,482 and Christian C. Petersen, U.S. Pat. No. 3,691,312.

The present invention contemplates a toothed, rotatable disc upon which the locus is inscribed mounted on one side of a frame and engaged with a second non-concentric toothed rotatable disc mounted on the same side of the frame. The second disc supports the sound track in proper orientation with respect to the locus whereby permanent alignment is achieved between the locus and the sound track. A disc-like sound track member is replaceably mounted on the first disc. Means is provided for mounting a picture or other still visual image.

DESCRIPTION OF THE PREFERRED EMBODIMENT

Figure 1:
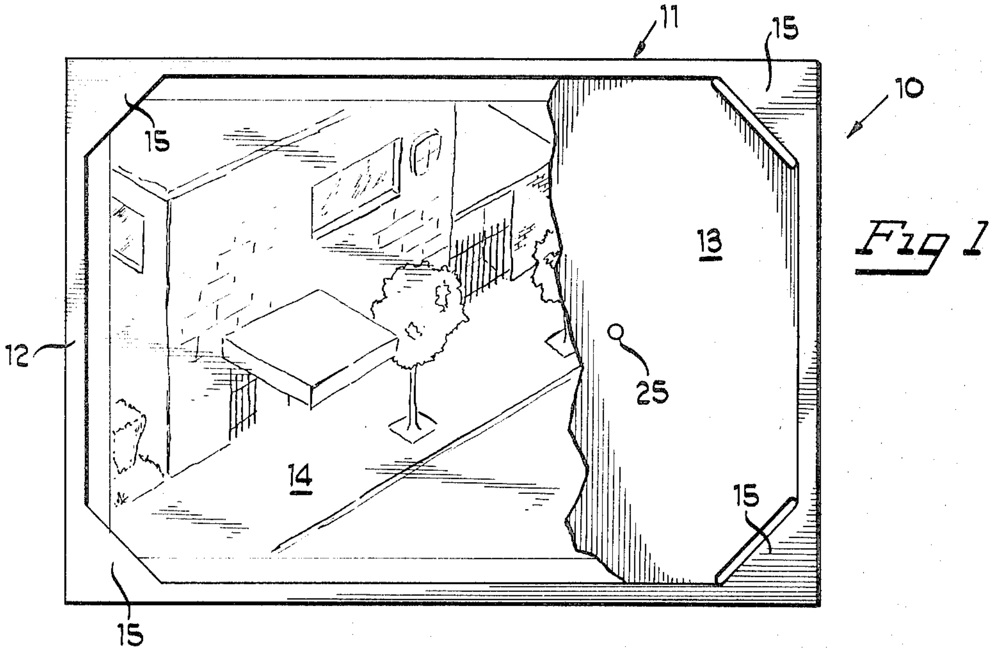
FIG. 1 is a top plan view of the device of the present invention.
Figure 3:
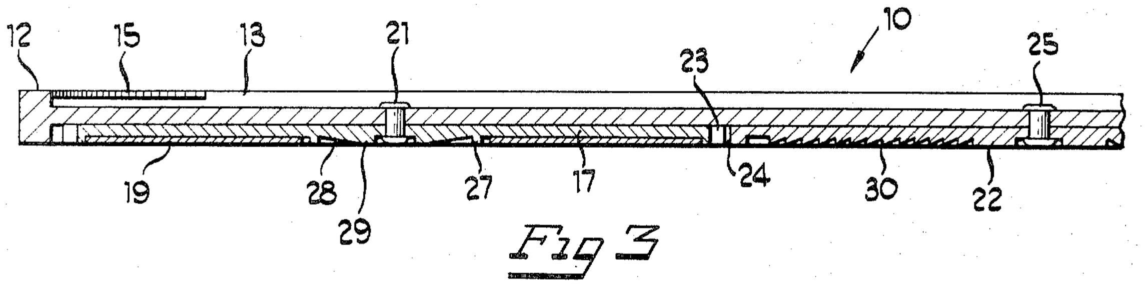
FIG. 3 is a transverse, sectional view taken generally along the broken line 3—3 of FIG. 2.

As seen particularly in FIGS. 1 and 3, the recording and reproducing device, generally designated 10, embodying the concepts of the present invention comprises a frame, generally designated 11 of molded plastic or other suitable material, an outer flange 12 forming a rectangular recessed area 13 on the top side thereof suitable for holding a photograph or other visual image 14. The photograph 14 is secured by means of four tabs 15 which may be molded as an integral part of the frame flange 12.

Figure 2:
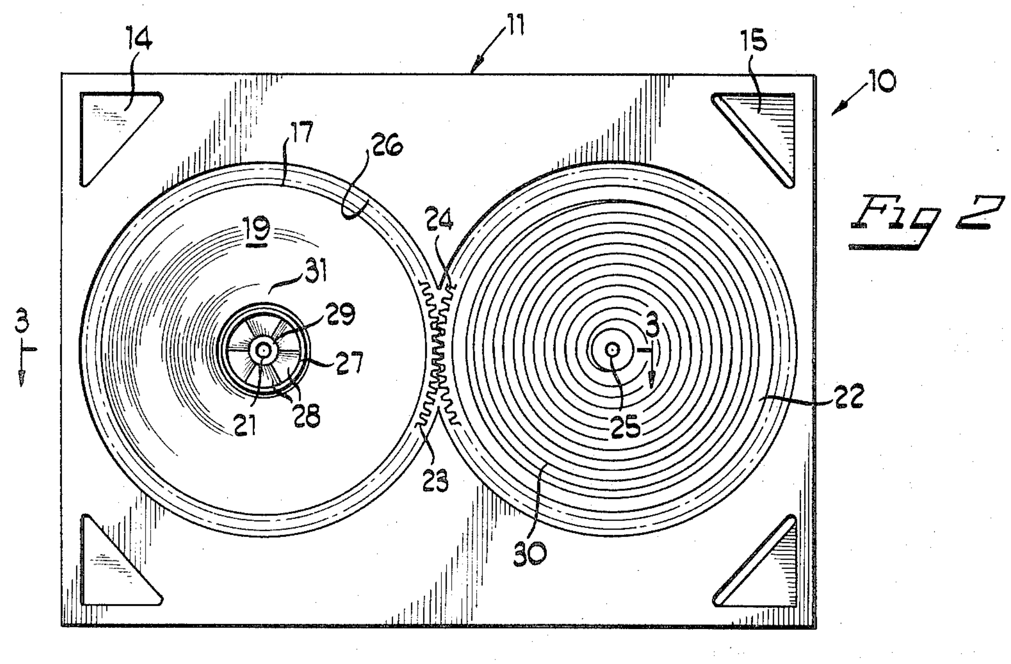
FIG. 2 is a bottom view of the device.

On the reverse side of the frame (as seen in FIG. 2), a toothed, disc-like carrier means 17 having a recording surface 19 thereon is rotatably secured to the frame 11 by means of a rivet 21. The carrier 17 is in permanent engagement with a similar toothed, disc-like locus generating means 22 through a gearing means comprising teeth 23, 24 located on the peripheral circumference of the carrier 17 and the locus generating means 22. The locus generating means 22 is rotatably secured to the frame 11 by means of a rivet 25. Both the carrier 17 and the locus generating means 22 are mounted to the frame in a figure eight recess 26 such that the recording surface 19 and the locus generating means 22 are located generally in the same plane as the bottom surface of the flange 12.

Rotation of the carrier 17 is achieved through a one-way clutch device 27 formed in the central portion of the carrier 17. The one-way clutch device is composed of a plurality of inclined surface segments 28 angularly arranged around a hub 29. In use, the one-way clutch device 27 is placed in contact with a suitable complementary surface providing one-way rotation to the carrier 17. The locus generating means 22 is driven by the carrier 17 through the gears 23, 24 at the same rpm as the carrier 17.

The locus generating means 22 is provided with a spiral groove 30 suitable for guiding an appropriate follower directly connected to a transducer head along a path identical to the path of the recorded message on the recording surface 19. The recording surface 19 may be either of the permanent type secured to the carrier 17 by use of an adhesive or of the interchangeable type secured to the carrier means 17 by friction, snap fit, or otherwise, between the edges of the recording surface 19 and the carrier means 17 and oriented properly with respect to the locus generating means 22 by the use of a key 31.

Any number or types of appropriate pick-up or transducer heads, locus followers and drive means as is known in the art as listed above may be adapted for use with the present invention.

From the foregoing description, it can be seen that the presently described device can be inexpensively manufactured in small, compact form. The spiral groove 30 on the locus generating means 22, being separate and non-concentric from the carrier 17, can be easily and cheaply manufactured. In other words, since the carrier 17 and the locus generating means 22 rotate at the same rpm, the spiral groove 30 can be made identical to the desired path of the recorded message. Consequently, the manufacturing process is simplified to the extent that the spiral groove 30 can be constructed without the intricate and complicated computations and machinery required to produce previously disclosed locus generating devices shown in the above described structures. However, as seen in FIG. 3, the spiral groove 30 on the locus generating means 22 is in a saw-toothed configuration whereby the guiding abutment surfaces face outwardly from the center of the locus generating means whereby an appropriate locus follower will be moved outwardly from the center of the locus generating means toward the periphery thereof while at the same time an appropriate pickup or transducer head can be moved inwardly from the periphery of the carrier 17 to the center thereof. This can further facilitate the compactness of the cartridge. Of course, the recording surface 19 would have to be similarly cut.

The foregoing detailed description has been given for clearness of understanding only and no unnecessary limitations should be understood therefrom, as it will be apparent that modifications may be made without departing from the principles of the invention.

I claim:

1. A cartridge for use in recording and reproducing audible signals, comprising:

a cartridge frame;

a generally disc-like carrier means rotatably mounted on the frame for rotation about a first axis and having means defining a recording surface thereon capable of retaining a recorded message;

a generally disc-like, separate locus generating means rotatably mounted on the frame for rotation about a second axis generally parallel to said first axis and disposed generally coplanar with the carrier means for use in properly orientating an appropriate transducer head with respect to the recording surface during recording and playback; and means directly, drivingly interconnecting the disc-like members whereby one of which is a driving member and the other of which is a driven member, for rotating the driven member in a direction opposite that of the driving member.

2. The device of claim 1 wherein the means directly drivingly interconnecting the disc-like members comprises gear teeth about the periphery of the carrier means in engagement with complementary gear teeth about the periphery of the locus generating means.

3. The device of claim 1 wherein the carrier means has means for interchangeably mounting a recording member having said recording surface thereon, thereby permitting the use of a plurality of recording members containing different messages.

4. The device of claim 3 wherein the frame has means for interchangeably mounting a visual image thereon thereby permitting the use of a plurality of visual images to be associated with the recorded message of one or more of said recorded members.

* * * * *